J. T. RONALD.
WHEEL RIM.
APPLICATION FILED APR. 10, 1916.
1,228,970.
Patented June 5, 1917.
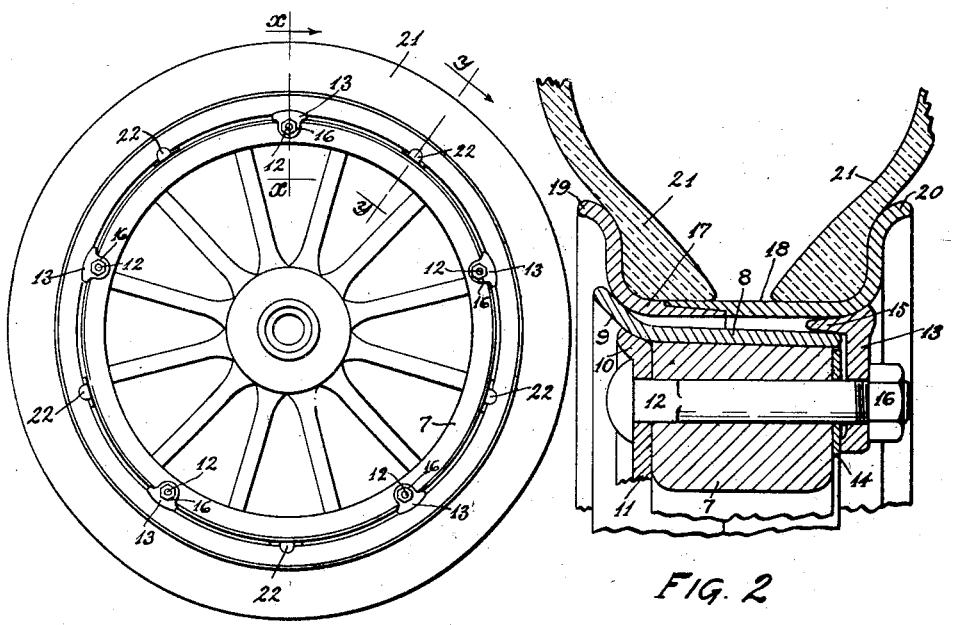
FIG. 1
FIG. 2
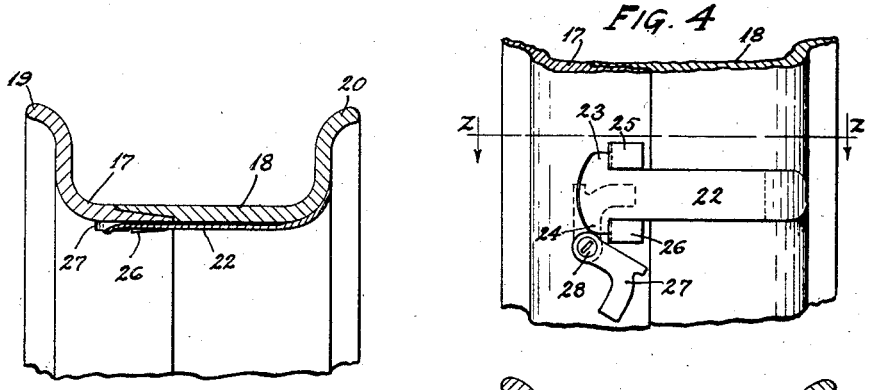
FIG. 3
FIG. 4
FIG. 5
WITNESS
INVENTOR
James T. Ronald
BY
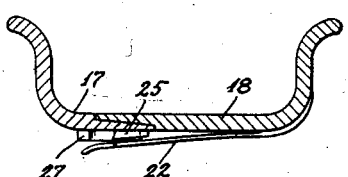
ATTORNEY

UNITED STATES PATENT OFFICE.

JAMES T. RONALD, OF SEATTLE, WASHINGTON.

WHEEL-RIM.

1,228,970.　　　　Specification of Letters Patent.　　Patented June 5, 1917.

Application filed April 10, 1916. Serial No. 90,270.

*To all whom it may concern:*

Be it known that I, JAMES T. RONALD, a citizen of the United States, residing at Seattle, in the county of King and State of Washington, have invented a certain new and useful Improvement in Wheel-Rims, of which the following is a specification.

My invention relates to improvements in vehicle wheel rims each of which is provided with oppositely disposed integral flanges of curved cross-section and each of which embodies two separable sections united by a telescopic joint whereby it may be separated into two bands to facilitate the operation of mounting thereon or removing therefrom a pneumatic tire of a commonly known form used on automobile wheels, and one object of my invention is to provide such a wheel rim upon which may be removably mounted, quickly and easily, a pneumatic tire, and which wheel rim, itself, shall be adapted to be removably mounted securely upon the felly of a vehicle wheel in such manner that when it becomes necessary to repair said tire, or to substitute a new one therefor, then said wheel rim may quickly be removed from said felly, and the tire then be removed from said wheel rim, and a new tire of like form, or the same tire after it is repaired, may quickly be disposed and fastened on said wheel rim and said wheel rim then again be readily mounted on said felly.

A more particular object of my invention is to provide such wheel rim with effective and reliable devices for so locking together the two telescopically joined parts of said wheel rim that such locking devices cannot be tampered with or unlocked to permit the separation of such telescopically joined parts when said wheel rim is disposed to surround the felly of a wheel, as, for instance, a wheel of an automobile, which devices shall be adapted to be actuated automatically to lock together said two parts in response to the act of forcing them into engagement with each other to effect the telescopic joint, and with which devices shall be associated other devices which at required times may be disposed to prevent said locking devices from being effective.

I accomplish these objects by devices illustrated in the accompanying drawings wherein Figure 1 is a view in side elevation of an automobile wheel provided with a wheel rim embodying my invention upon which wheel rim a pneumatic tire is mounted; Fig. 2 is a fragmentary view of the same on a larger scale in radial section on broken line $x, x$ of Fig. 1; Fig. 3 is a fragmentary view of the same, on such larger scale, in radial section on broken line $y, y$ of Fig. 1 but not showing the pneumatic tire; Fig. 4 is a fragmentary view, on the same larger scale, showing the internal circular surface of the wheel rim of the same with some of its associated details; and Fig. 5 is a view, on the same larger scale, showing said wheel rim in radial section on broken line $z, z$ of Fig. 4, and some associated parts in side elevation.

Referring to the drawings, throughout which like reference numerals indicate like parts, 7 designates the felly of an automobile wheel, which felly 7 is encircled with a metal band 8 that is provided with an integral flange 9 which projects beyond the outer edge of the back side surface of said felly 7, as shown more clearly in Fig. 2.

The metal band 8 is prevented from a sidewise movement in one direction by the flange 10 of an annular member 11 that is secured to the back side surface of the felly 7 by bolts 12 which also serve to force clamping members 13 into engagement with the front edge of said metal band 8 and an annular plate 14 that is secured to the front side surface of the felly 7 whereby said metal band 9 is prevented from a sidewise movement in an opposite direction, and that portion of each of the clamping members 13 that engages with the front edge of said metal band 8 projects over the periphery of said band 8 in the form of a wedge 15 whose top surface is slightly curved upwardly and outwardly to adapt it to engage with a wheel rim, as more clearly shown in Fig. 2.

Disposed to encircle the metal band 8 is a wheel rim of such larger internal diameter than the external diameter of said metal band 8 that it engages only with the upper portion of the inner side of the flange 9 of said metal band 8 and with the top curved surface of the wedge 15 of the clamping members 13 whereby there is provided an annular space between the periphery of the metal band 8 and said wheel rim, as shown in Fig. 2, and whereby the nut 16 of the bolt 12 may be operated to cause the wedge 15 to rigidly secure and maintain said wheel rim in its position to be supported by said clamping members 13 and the flange 9 of the metal band 8, as shown.

Obviously, to dismount said wheel rim from the wheel it is only necessary to unscrew the nuts 16 for a sufficient distance to permit the wedges 15 to be withdrawn to a point where the clamping members 13 may be turned to a position to permit said wheel rim to be removed in a sidewise direction from the wheel.

As shown in Figs. 2, 3, 4 and 5, said wheel rim comprises two telescopically joined flanged members 17 and 18, respectively, the telescopic joint thereof being disposed nearer to the flange 19 of the member 17 than to the flange 20 of the member 18 whereby the surface of a pneumatic tire, as pneumatic tire 21, may cover that portion of the telescopic joint that is on the peripheral side of said wheel rim thus to prevent any water from gaining access to the interior of the tire 21 through said telescopic joint.

Electrically welded to the curved surface of the front edge portion of the inner circle of the member 18 of the wheel rim, at each of equidistant points thereon, is one end portion of a flat locking spring 22 which extends directly crosswise therefrom to a point near the curved surface of the back edge portion of the inner circle of the member 17, which spring 22 is adapted to exert its force normally to engage itself with the adjacent surfaces of both members 17 and 18 of the wheel rim.

The free end portion of each of the springs 22 is curved in a direction from the adjacent surface of the member 17, and such free end portion is provided with integral lugs 23 and 24 that are symmetrically disposed to project in opposite sidewise directions therefrom, which lugs 23 and 24 are thereby adapted to engage respectively with catches 25 and 26, which project from the surface of the member 17 one on each side of said spring 22.

The sides of the catches 25 and 26 which engage respectively with the lugs 23 and 24 are undercut, whereby any force exerted with a tendency to separate the members 17 and 18 would tend to cause the lugs 23 and 24 to engage their inner surfaces with the adjacent surface of the member 17 with greater pressure, instead of tending to cause said spring 22 to be forced to move away from its contact with the adjacent surface of the member 17.

The sides of the catches 25 and 26 which engage with the lugs 23 and 24 project from the adjacent surface of the member 17 for a greater distance than do the opposite sides thereof whereby the surfaces extending between said sides will constitute inclined planes which may act in a cam-like manner to raise the springs 22 as the lugs 23 and 24 ride thereover when the two members 17 and 18 move toward each other in the operation of uniting them by the telescopic joint, upon the completion of which joint the springs 22 by their own force will enter the space between the catches 25 and 26 while the lugs 23 and 24 will engage with the engaging sides of said catches 25 and 26, which position is more clearly shown in Fig. 3, and in which position the springs 22, with their lugs 23 and 24 in engagement with catches 25 and 26, will securely lock the members 17 and 18 together in such manner that they can in no way be separated so long as the wheel rim formed by said members 17 and 18 is disposed to encircle the metal band 8, which is disposed to surround the felly 7, since the annular space between said wheel rim and said metal band 8 is too small to permit the lugs 23 and 24 to be moved to disengage the catches 25 and 26.

When the wheel rim has been removed from the metal band 8 and it is desired to remove the tire 21 from said wheel rim, in order to facilitate the separation of the members 17 and 18 I have provided levers, as levers 27, of angular form, one of which is disposed adjacent to each of the catches 26 with one of its ends pivotally secured by a screw 28 to the adjacent surface of the member 17, as more clearly shown in Fig. 4, whereby said lever 27 may be swung from its position indicated by full lines, to the position indicated by broken lines in said Fig. 4, thus to be forced under the free end portion of said spring 22 to raise the lugs 23 and 24 from engagement with the catches 25 and 26 to the position shown in Fig. 5, thereby to permit a separation of the members 17 and 28 in an obvious manner.

By such plan of construction the members 17 and 18 of my wheel rim may be united by a telescopic joint and in the operation of completing such telescopic joint said members 17 and 18 will be automatically locked together in such manner that they cannot be unlocked after said wheel rim is disposed to encircle the felly of a wheel; but upon the removal of said wheel rim from the felly of a wheel, said members 17 and 18 may readily be unlocked and separated by swinging the several levers 27 to cause them to raise the lugs 23 and 24 out of engagement with the catches 25 and 26 in an obvious manner.

Manifestly, changes may be made in the forms, dimensions and arrangement of parts of my invention without departing from the spirit thereof.

What I claim is:

1. A wheel rim of the class described, which embodies two bands separably joined together by a telescopic joint, and a plurality of self acting locks associated with said two bands and adapted automatically to lock said two bands together in response to the operation of forcibly uniting said two bands to complete said telescopic joint, the different parts of said self acting locks being so disposed that they cannot be unlocked while said two bands are operatively associated with a vehicle wheel, and means directly engaging the operative end of one of said locks to disengage the same from the companion member whereby the rim bands may be separated.

2. A wheel rim of the class described, which embodies two bands separably joined together by a telescopic joint; a plurality of self acting locks associated with said two bands and adapted automatically to lock said two bands together in response to the operation of forcibly uniting said two bands to complete said telescopic joint, the different parts of said self acting locks being so disposed that they cannot be unlocked while said two bands are operatively associated with a vehicle wheel; and a releasing element hinged to one rim band adapted to be moved to engage the lock element carried by the other band to disengage the locks.

3. A wheel rim including band sections having overlapped adjacent edges, lugs carried by one of the rim bands and arranged in pairs, a plurality of T-shaped lock elements carried by the other band with the heads thereof associated with the pairs of lugs to hold the rim sections assembled, and swinging releasing elements adapted individually to be moved to engage and release the T-shaped elements from the lugs to disconnect the rim bands.

4. A wheel rim including band sections telescopically connected, pairs of retaining elements carried by one band section, members coöperating with each pair of retaining elements carried by the other band section, and means movable to a position between the members of each pair of retaining elements to engage said member to shift the same to inoperative position.

In witness whereof, I, hereunto subscribe my name this third day of April A. D. 1916.

JAMES T. RONALD.

Witnesses:
 O. JOHNSON,
 FRANK WARREN.